United States Patent
Schabes

(10) Patent No.: US 8,089,723 B2
(45) Date of Patent: Jan. 3, 2012

(54) DAMPING CONTROL IN MAGNETIC NANO-ELEMENTS USING ULTRATHIN DAMPING LAYER

(75) Inventor: Manfred Ernst Schabes, Saratoga, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 1010 days.

(21) Appl. No.: 11/839,034

(22) Filed: Aug. 15, 2007

(65) Prior Publication Data

US 2008/0212241 A1 Sep. 4, 2008

Related U.S. Application Data

(63) Continuation-in-part of application No. 11/548,506, filed on Oct. 11, 2006.

(51) Int. Cl.
*G11B 5/127* (2006.01)
*G11B 5/187* (2006.01)

(52) U.S. Cl. ............ 360/125.02; 360/122; 360/125.3; 360/125.12

(58) Field of Classification Search .......... 428/812; 360/125.02–125.04, 125.12, 122, 125.3
See application file for complete search history.

(56) References Cited

U.S. PATENT DOCUMENTS

| | | | |
|---|---|---|---|
| 5,450,009 A * | 9/1995 | Murakami | 324/207.21 |
| 5,796,560 A | 8/1998 | Saito et al. | |
| 6,348,274 B1 * | 2/2002 | Kamiguchi et al. | 428/811 |
| 6,452,240 B1 | 9/2002 | Ingvarsson et al. | |
| 6,621,732 B2 | 9/2003 | Allenspach et al. | |
| 6,819,531 B2 | 11/2004 | Shiroishi | |
| 6,829,161 B2 | 12/2004 | Huai et al. | |
| 6,847,547 B2 | 1/2005 | Albert et al. | |
| 7,595,959 B2 * | 9/2009 | Covington et al. | 360/125.02 |
| 2002/0064002 A1 * | 5/2002 | Gill | 360/319 |
| 2004/0120074 A1 * | 6/2004 | Okada et al. | 360/126 |
| 2004/0170055 A1 * | 9/2004 | Albert et al. | 365/173 |
| 2004/0233578 A1 | 11/2004 | Gao | |
| 2004/0253437 A1 | 12/2004 | Ingvarsson et al. | |
| 2005/0013045 A1 * | 1/2005 | Hasegawa et al. | 360/126 |
| 2005/0041342 A1 * | 2/2005 | Huai et al. | 360/324.12 |

(Continued)

FOREIGN PATENT DOCUMENTS

JP 10294505 11/1998

(Continued)

OTHER PUBLICATIONS

S.G. Reidy et al., Dopants for Independent Control of Precessional Frequency and Damping in Ni81-Fe19 (50nm) Thin Forms, Applied Physics Letters, vol. 82, No. 8, Feb. 24, 2003, pp. 1254-1256.

(Continued)

*Primary Examiner* — Will J Klimowicz
(74) *Attorney, Agent, or Firm* — Patterson & Sheridan, LLP

(57) ABSTRACT

A write head and a method for forming the write head. The method includes providing a first pole and a second pole for the write head. The first pole and the second pole are formed from a ferromagnetic material. Regions of the write head including at least a portion of at least one of the first pole and the second pole of the write head are volumetrically doped with a dopant material selected from one of a 4d transition metal, 5d transition metal, and 4f rare earth metal. The dopant material is predetermined to provide a magnetic damping in the doped regions which is greater than the magnetic damping in the ferromagnetic material.

8 Claims, 14 Drawing Sheets

U.S. PATENT DOCUMENTS

| | | |
|---|---|---|
| 2005/0135020 A1 | 6/2005 | Sugita et al. |
| 2005/0185454 A1 | 8/2005 | Brown et al. |
| 2007/0003792 A1* | 1/2007 | Covington et al. ........... 428/812 |
| 2007/0086121 A1* | 4/2007 | Nagase et al. ............. 360/324.1 |
| 2007/0171575 A1* | 7/2007 | Lim et al. ...................... 360/133 |
| 2008/0088983 A1* | 4/2008 | Meyer et al. ............... 360/324.1 |
| 2009/0027810 A1* | 1/2009 | Horng et al. ............... 360/324.2 |

FOREIGN PATENT DOCUMENTS

| | | |
|---|---|---|
| WO | WO2005101378 | 10/2005 |

OTHER PUBLICATIONS

William Bailey et al., Control of Magnetization Dynamics in Ni81Fe19 Thin Films Through the Use of Rare-Earth Dopants, IEEE Transactions of Magnetics, vol. 37, No. 4, Jul. 2001, pp. 1749-1754.

Office Action History of U.S. Appl. No. 11/548,506, dates ranging from Oct. 7, 2009 to Oct. 4, 2010.

* cited by examiner

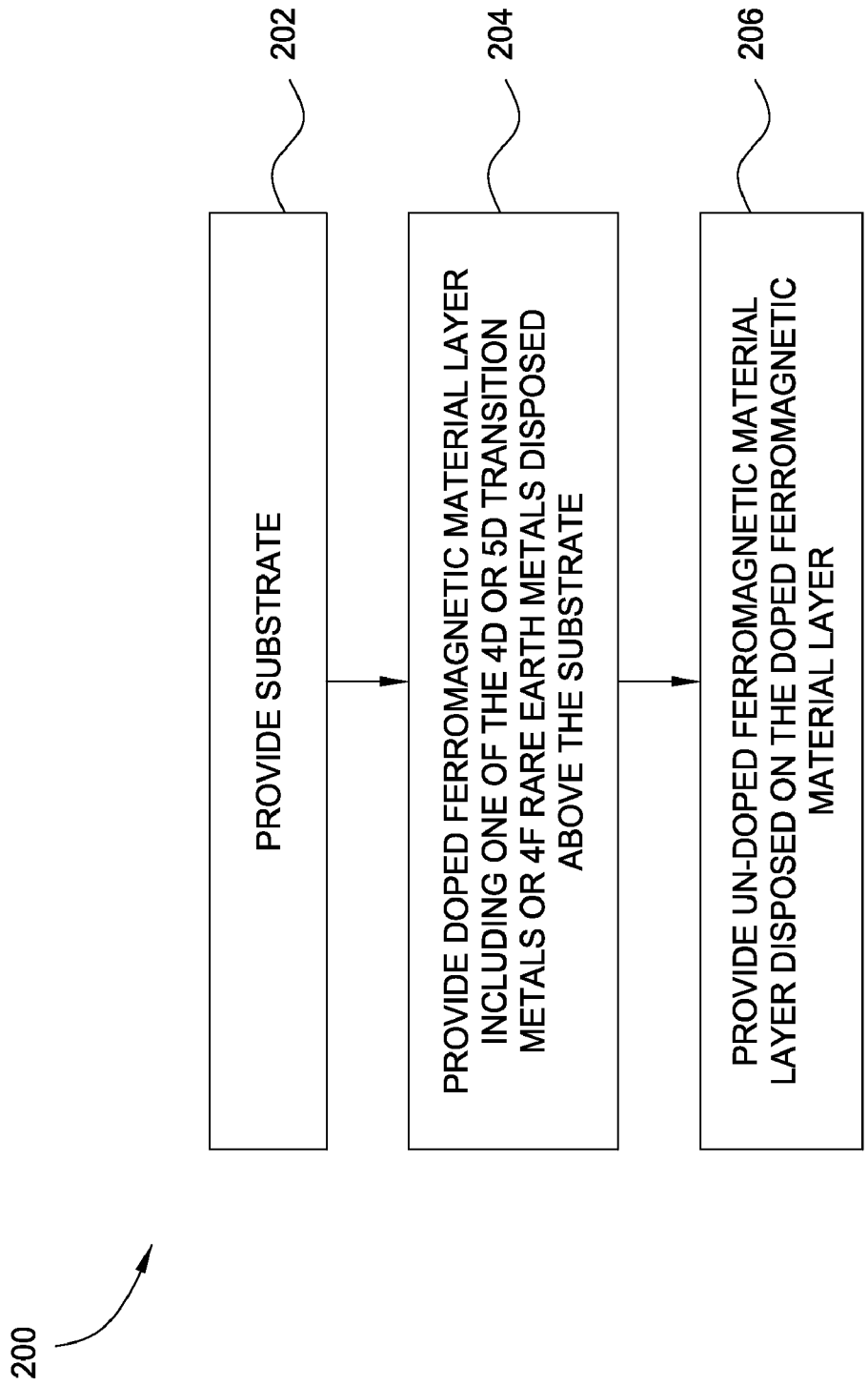

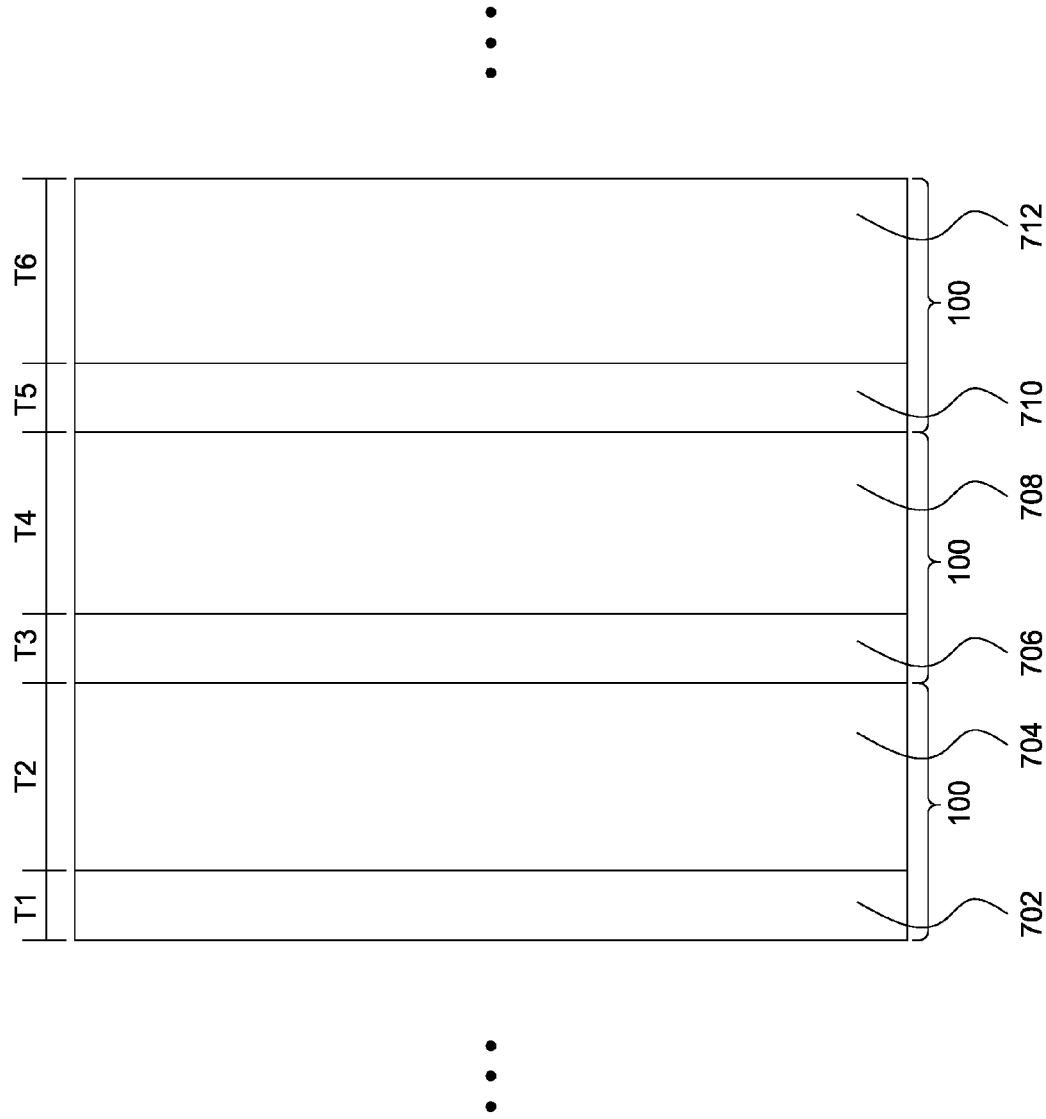
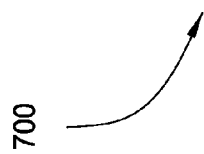
FIG. 7

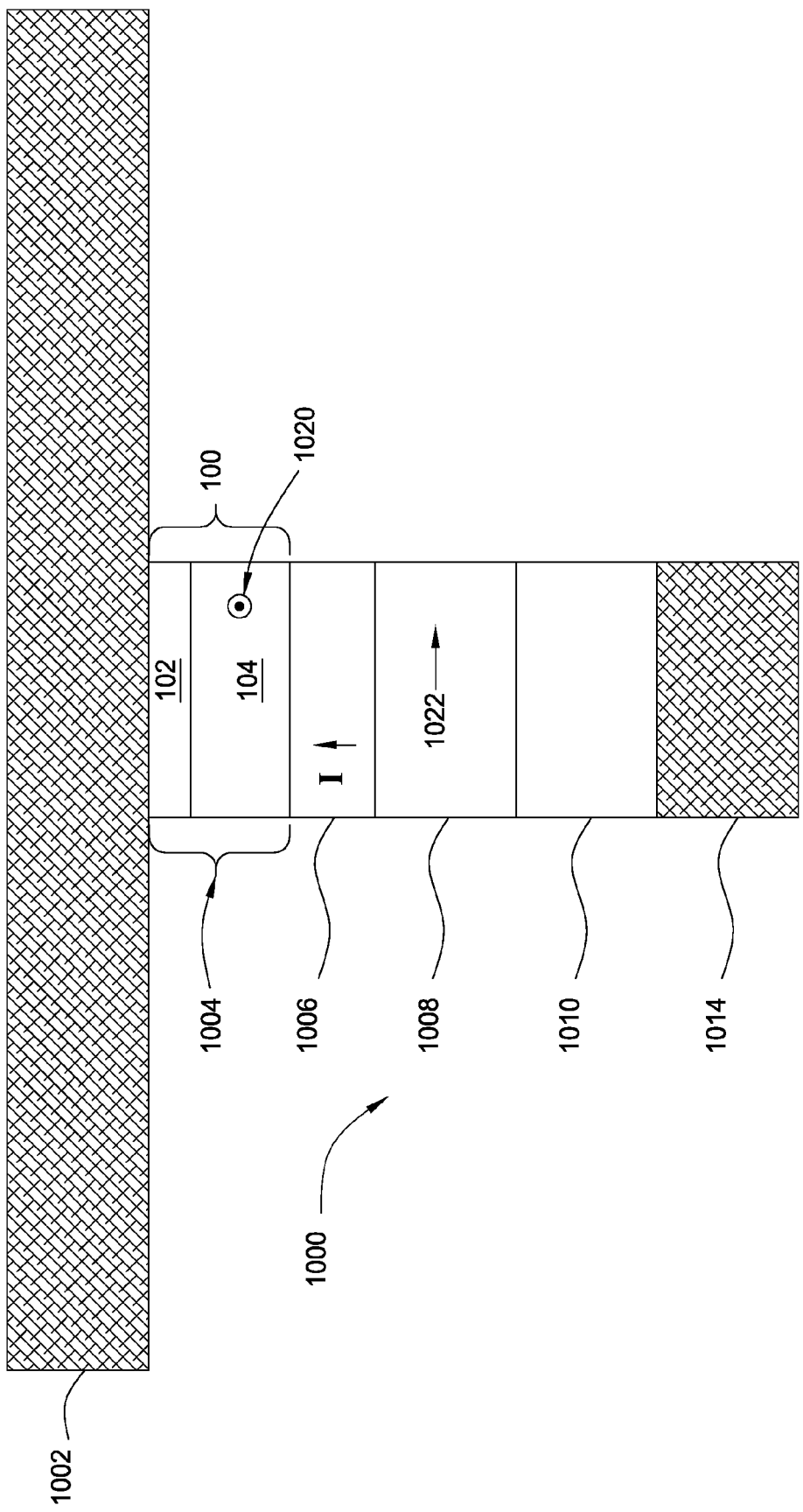

DAMPING CONTROL IN MAGNETIC NANO-ELEMENTS USING ULTRATHIN DAMPING LAYER

CROSS-REFERENCE TO RELATED APPLICATIONS

This application is a continuation-in-part of co-pending U.S. patent application Ser. No. 11/548,506, filed Oct. 11, 2006, which is herein incorporated by reference.

BACKGROUND OF THE INVENTION

1. Field of the Invention

Embodiments of the present invention generally relate to magnetic materials. Specifically, embodiments of the invention relate to magnetic films and nanostructures, methods for manufacturing magnetic films and nanostructures, and apparatuses using magnetic films and nanostructures.

2. Description of the Related Art

Many modern electronic memory devices such as random access memories (RAM) and hard disk drives are used to store and retrieve data. In some cases, such memory devices may incorporate ferromagnetic materials which may be subjected to an externally applied magnetic field which may switch their magnetization between two stable orientations representing, for example, two logical values. Typically, when a magnetic field applied to a ferromagnetic material is switched from a first value to a second value, the magnetization of the ferromagnetic material may not immediately switch from the first value to the second value. For example, the magnetization of the ferromagnetic material may be subject to magnetic precession wherein the magnetization of the ferromagnetic material oscillates (or "rings") until settling at a steady state value.

In some cases, magnetic precession of the magnetization of a ferromagnetic material may be affected by intrinsic properties of the material. The amount of time needed for the magnetization within a material to reach a steady state after the magnetic field applied to the material has been switched is described by the so-called Gilbert magnetic damping coefficient ($\alpha$) for the material. If the magnetic damping coefficient is high, then the magnetization of the material may reach a steady state value more quickly after the applied magnetic field has switched than for materials with a lower magnetic damping coefficient, resulting in a sharper transition of the magnetization of the ferromagnetic material to the steady state value.

In some cases, a high magnetic damping coefficient for a ferromagnetic material may be desired, for example in magnetic data storage applications, where a sharp transition of the magnetization of the ferromagnetic material under switching conditions may be desired, for example, to achieve high data transfer rates and storage densities. Accordingly, what is needed is an improved material having a high magnetic damping coefficient, a method for making the material, and apparatuses incorporating the material.

SUMMARY OF THE INVENTION

One embodiment of the invention provides a method for forming a write head. The method includes providing a first pole and a second pole for the write head. The first pole and the second pole are formed from a ferromagnetic material. The method also includes volumetrically doping regions of the write head including at least a portion of at least one of the first pole and the second pole of the write head with a dopant material selected from one of a 4d transition metal, 5d transition metal, and 4f rare earth metal. The dopant material is predetermined to provide a magnetic damping in the doped regions which is greater than the magnetic damping in the ferromagnetic material.

One embodiment of the invention also provides a magnetic write head. The magnetic write head includes a first pole and a second pole for the write head. The first pole and the second pole are formed from a ferromagnetic material. At least one of the first pole and the second pole are doped a dopant material selected from one of a 4d transition metal, 5d transition metal, and 4f rare earth metal. The dopant material is predetermined to provide a magnetic damping which is greater than the magnetic damping in the ferromagnetic material.

One embodiment of the invention also provides a hard drive. The hard drive includes a magnetic storage medium and a magnetic write head configured to write to the magnetic storage medium. The write head comprises a first pole and a second pole for the write head. The first pole and the second pole are formed from a ferromagnetic material. At least one of the first pole and the second pole are doped a dopant material selected from one of a 4d transition metal, 5d transition metal, and 4f rare earth metal. The dopant material is predetermined to provide a magnetic damping n doped regions which is greater than the magnetic damping in the ferromagnetic material.

Another embodiment of the invention provides a method for forming a write head. The method includes providing a first pole and a second pole for the write head. The first pole and the second pole are formed from a ferromagnetic material. The method also includes volumetrically doping regions of the write head including at least a portion of at least one of the first pole and the second pole of the write head with a dopant material selected from one of a 4d transition metal, 5d transition metal, and 4f rare earth metal excluding Gadolinium.

One embodiment of the invention further provides a write head. The write head includes a first pole and a second pole. The first pole and the second pole are formed from a ferromagnetic material. The write head comprises doped regions of the ferromagnetic material wherein at least a portion of at least one of the first pole and the second pole of the write head include a dopant material selected from one of a 4d transition metal, 5d transition metal, and 4f rare earth metal excluding Gadolinium.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 2 is a flow diagram depicting a method for making the magnetic bilayer according to one embodiment of the invention.

FIG. 7 is a block diagram depicting laminated magnetic bilayers according to one embodiment of the invention.

FIG. 10 is a block diagram depicting a magnetic random access memory (MRAM) memory cell according to one embodiment of the invention.

DETAILED DESCRIPTION

Figure 1:
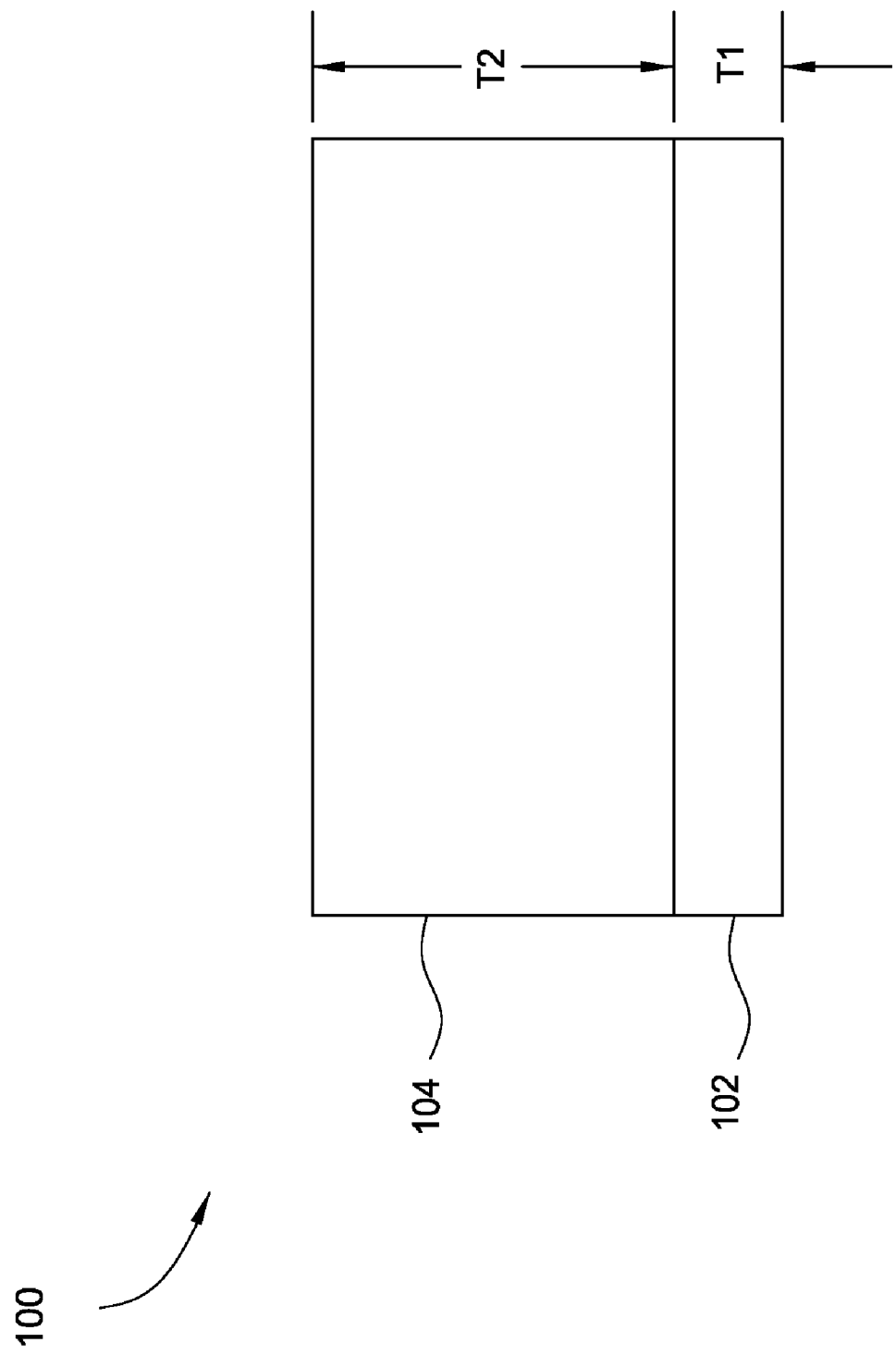
FIG. 1 is a block diagram depicting an exemplary magnetic bilayer according to one embodiment of the invention.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are in part illustrative and, unless explicitly present, are not considered elements or limitations of the appended claims.

Embodiments of the present invention provide a thin-film ferromagnetic layer system which may be used in a variety of electronic devices. In one embodiment, the layer system includes a bilayer with a first layer of ferromagnetic material doped with a dopant selected from one of a 4f rare earth metal, 4d transition metal, and 5d transition metal, wherein the dopant is predetermined to produce an increased magnetic damping within the bilayer. The bilayer also includes a second layer of ferromagnetic material disposed on the first layer. By disposing the second layer on the first layer, the first layer and second layer may be exchange coupled, thereby increasing the magnetic damping within the second layer. The increased magnetic damping in the bilayer may provide magnetic field transitions in both the first and second layer which reach a steady-state value more quickly, i.e., with shorter-lasting, reduced oscillations or ringing than undoped ferromagnetic materials. Furthermore, harmful contact between the first layer and a surface of the second layer may be prevented in a bilayer. For example, any activity at the interface between the second layer and further material may be protected from disturbances other than damping which are caused by the presence of the dopant material. In some cases, interface activities that are necessary for the operation of the device may be highly affected by the choice of materials at the surface of the second layer. The second layer may isolate the first layer from any activity to which the surface of the second layer may be exposed, thereby preventing degradation of the first layer. Optionally, the second layer may prevent exposure of the first layer to an atmosphere containing oxygen, or exposure of the first layer to a warm, humid atmosphere, thereby preventing detrimental oxidation or corrosion of the first layer.

Embodiments of the invention also provide a write head and a method for forming a write head. The method includes providing a first pole and a second pole for the write head. The first pole and the second pole are formed from a ferromagnetic material. The method also includes volumetrically doping regions of the write head including at least a portion of at least one of the first pole and the second pole of the write head with a dopant material selected from one of a 4d transition metal, 5d transition metal, and 4f rare earth metal. The dopant material is predetermined to provide a magnetic damping in the doped regions which is greater than the magnetic damping in the ferromagnetic material.

FIG. 1 is a block diagram depicting an exemplary bilayer 100 according to one embodiment of the invention. As depicted, the bilayer may include a first layer 102 and a second layer 104. In one embodiment, the first layer 102 may be formed of a ferromagnetic material and an additional dopant material. For example, the first layer 102 may be formed from cobalt-iron and a dopant material (e.g., CoFeX, where X is the dopant material). The ferromagnetic material in the first layer 102 may also include nickel-iron (NiFe) or any other ferromagnetic material. Similarly, the second layer may be formed from a ferromagnetic material such as CoFe, NiFe, or any other appropriate ferromagnetic material. In one embodiment, the first layer 102 and the second layer 104 may be formed from the same ferromagnetic material. Optionally, the first layer 102 and the second layer 104 may be formed from different ferromagnetic materials. For example, the first layer 102 may be formed from NiFe and a dopant material while the second layer 104 may be formed from CoFe.

In one embodiment, the dopant material may include one of a 4d or 5d transition metal. The 4d transition metals may include niobium (Nb), ruthenium (Ru), and rhodium (Rh). 5d transition metals may include tantalum (Ta), osmium (Os), and platinum (Pt). In one embodiment, the dopant material may also be a 4f rare earth metal. The 4f rare earth metals may include the 14 lanthanides with a partially or completely filled 4f electron shell: cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb) and lutetium (Lu).

In one embodiment of the invention, the selected dopant material may be predetermined to provide increased magnetic damping within the first layer 102. Thus, in one embodiment, some elements listed above, such as the 4f rare earth metals europium and gadolinium, which may not produce increased damping in the first layer, may not be used as a dopant in the first layer 102. In some cases, the increased magnetic damping may be described in terms of decay time of a magnetic signal, described below in greater detail. For example, the increased magnetic damping may be expressed as a magnetic damping which provides a decay time which is smaller than the intrinsic decay time of the ferromagnetic material used in the first layer 102. For example, if the intrinsic decay time of the first layer before doping is 0.65 nanoseconds (ns), then the selected dopant may provide a decay time which is less than 0.65 ns in the doped first layer 102.

Furthermore, while embodiments of the invention include a first layer 102 which includes any amount of a selected dopant material described above, in one embodiment of the invention, the amount of dopant in the first layer 102 may not exceed an amount which provides sufficient magnetic damping in the first layer 102. For example, in one embodiment, the dopant material may be less than or equal to fifteen percent (15%) of the first layer 102.

FIG. 2 is a flow diagram depicting a process 200 for forming the magnetic bilayer 100 according to one embodiment of the invention. In one embodiment, the process 200 may include providing a substrate material at step 202. The substrate material may provide a base on which other layers, including the bilayer 100, may be placed, e.g., via deposition, growth, or any other method known to those skilled in the art. At step 204, a doped ferromagnetic material layer (e.g., the first layer 102) disposed above the substrate may be provided. The dopant material, as described above, may include one of the 4d transition metals, 5d transition metals, and 4f rare earth metals. In one embodiment of the invention, the doping of the ferromagnetic material within the first layer 102 may be performed via co-deposition (e.g., by sputtering) of the ferromagnetic material and the dopant material. Optionally, any other appropriate method of doping known to those skilled in the art may be used to provide the dopant material and ferromagnetic material within the first layer 102.

At step 206, an un-doped ferromagnetic material layer (e.g., the second layer 104) disposed on the doped ferromagnetic material layer (the first layer 102) may be provided. In one embodiment, by providing the second layer 104 disposed on the first layer 102 (or vice versa), the first layer 102 and the second layer 104 may experience exchange coupling wherein the magnetizations within the first layer 102 and second layer 104 are coupled to each other (e.g., a change in the magnetization in the first layer 102 may cause a similar change in the magnetic field in the second layer 104). Thus, the magnetic damping provided by the dopant material in the first layer 102 may also extend to the second layer 104.

In one embodiment of the invention, the magnetic damping in the second layer 104 may be controlled (and, for example, specifically increased) by the increased damping in the first layer 102 via direct or indirect exchange coupling of the two magnetic layers 102, 104. Control of the exchange coupling may, for example, allow independent control of the damping and other magnetic properties such as, for example, magnetization and spin polarization of the second layer 104. Such control may allow improved device performance in a number of magnetic data storage-related applications described herein.

In one embodiment of the invention, the exchange coupling at the interface between the first layer 102 and second layer 104, measured by the surface exchange energy density Js in ergs per square centimeter ($erg/cm^2$) may be between 0 and 3 $erg/cm^2$, where the case of Js=0 describes purely magnetostatic coupling between the layers. Similarly, the damping in the first layer 102 may be between 0.01 and 0.15, as observed in macroscopic measurements of undoped and doped Permalloy, and similarly the damping in the second layer 104 may be between 0.01 and 0.05 as observed in undoped soft magnetic materials. However, in some cases, determination of atomistic damping in magnetic materials may be difficult in some cases only effective damping at the macroscopic level may be measured. Accordingly, embodiments of the invention may also cover all material combinations of the first layer and second layer where the damping coefficient $\alpha 1$ of the first layer 102 is significantly larger than the damping coefficient $\alpha 2$ of the second layer 104.

In some cases, the coupling between the first layer 102 and the second layer 104 may decrease with distance from the point where the first layer 102 and the second layer 104 contact each other (referred to as the interface between the first layer 102 and the second layer 104). Thus, in some cases, the magnetic damping provided by the first layer 102 to the second layer 104 may decrease with distance from the interface between the first layer 102 and the second layer 104.

As depicted in FIG. 1, the first layer 102 may have a first thickness T1 and the second layer 104 may have a second thickness T2. As described above, in some cases, magnetic damping provided by exchange coupling between the first layer 102 and second layer 104 may decrease in the second layer 104 with distance from the interface between the first layer 102 and the second layer 104. While embodiments of the invention cover any thickness T2 of the second layer 104, in one embodiment of the invention, the thickness of the second layer may also be below a selected thickness. Such an upper limit on thickness may, in some cases, provide sufficient magnetic damping throughout the second layer 104 without a significant decrease in magnetic damping within the second layer. For example, in one embodiment of the invention, the thickness of the second layer may be less than or equal to twenty nanometers (T2<=20 nm). As described below, where layers with a greater magnetic damping and a greater thickness are desired, multiple bilayers 100 may be laminated (e.g., multiple alternated first and second layers may be deposited) to provide the increased magnetic damping across the increased thickness of the laminated bilayers.

In some cases, in order to avoid over-damping, reduction of the exchange coupling between the first and second layers 102, 104 may also be desired. In one embodiment of the invention, additional layers sandwiched between the first layer 102 and the second layer 104 may provide reduced exchange coupling. For example, the first layer 102 and second layer 104 may be formed as part of a trilayer which includes a third layer located in between the first layer 102 and the second layer 104. The third layer may include a non-magnetic spacer layer which reduces the exchange coupling between the first and second layer 102, 104. In one embodiment of the invention, the third layer may be formed from copper (Cu) or ruthenium (Ru).

In one embodiment of the invention, the thickness of the second layer 104 may be selected to provide isolation for the first layer 102 from a material or location to which the second layer 104 may be exposed (e.g., isolation from/to a critical interface within a device, described below, or an atmosphere containing oxygen, both of which may be detrimental to the first layer 102) as described above. For example, in one embodiment of the invention, the first layer may be greater than or equal to 2 nanometers (nm) thick (T2>=2 nm).

As mentioned above, in one embodiment of the invention, the first layer 102 may not be placed at a critical interface within a device. A critical interface may include any interface within a device where an activity takes place which is necessary for operation of the device. Embodiments of the invention may provide increased magnetic damping of the functional first layer 102 without placing the first layer 102 directly at a critical interface. For example, in a tunneling sensor, the first layer 102 may not be placed adjacent to the tunneling layer where the tunneling effect within the sensor occurs. Similarly, in a giant magneto-resistive-type sensor (GMR sensor) or anisotropic magnetoresistive-type sensor (AMR sensor), the first layer 102 may not be placed adjacent to the separation layer between the free layer and pinned layer. In some cases, presence of dopants like the rare earth metal at the critical interface may have strong detrimental effects on the spin transport and thus the performance-critical magneto-resistance of the device. As described above, the bilayer may prevent such interference while still providing increased magnetic damping by placing the second layer 104 between the doped first layer 102 and the critical interface.

While embodiments of the invention may cover a first layer 102 with any thickness T1, in one embodiment of the invention, the thickness T1 of the first layer 102 may not exceed a selected thickness. In one embodiment of the invention, the doped first layer 102 may be under eight nanometers thick (e.g., the first layer 102 may be 5 nm thick). Optionally, where desired, the thickness of the first layer 102 may be less than or equal to two nanometers (T1<=2 nm). Such a thickness may provide sufficient magnetic damping in the first and second layers 102, 104 while minimizing the overhead devoted to forming the first layer 102 and, as described above, reducing exposure of the doped first layer 102 to detrimental conditions.

Figure 3A:
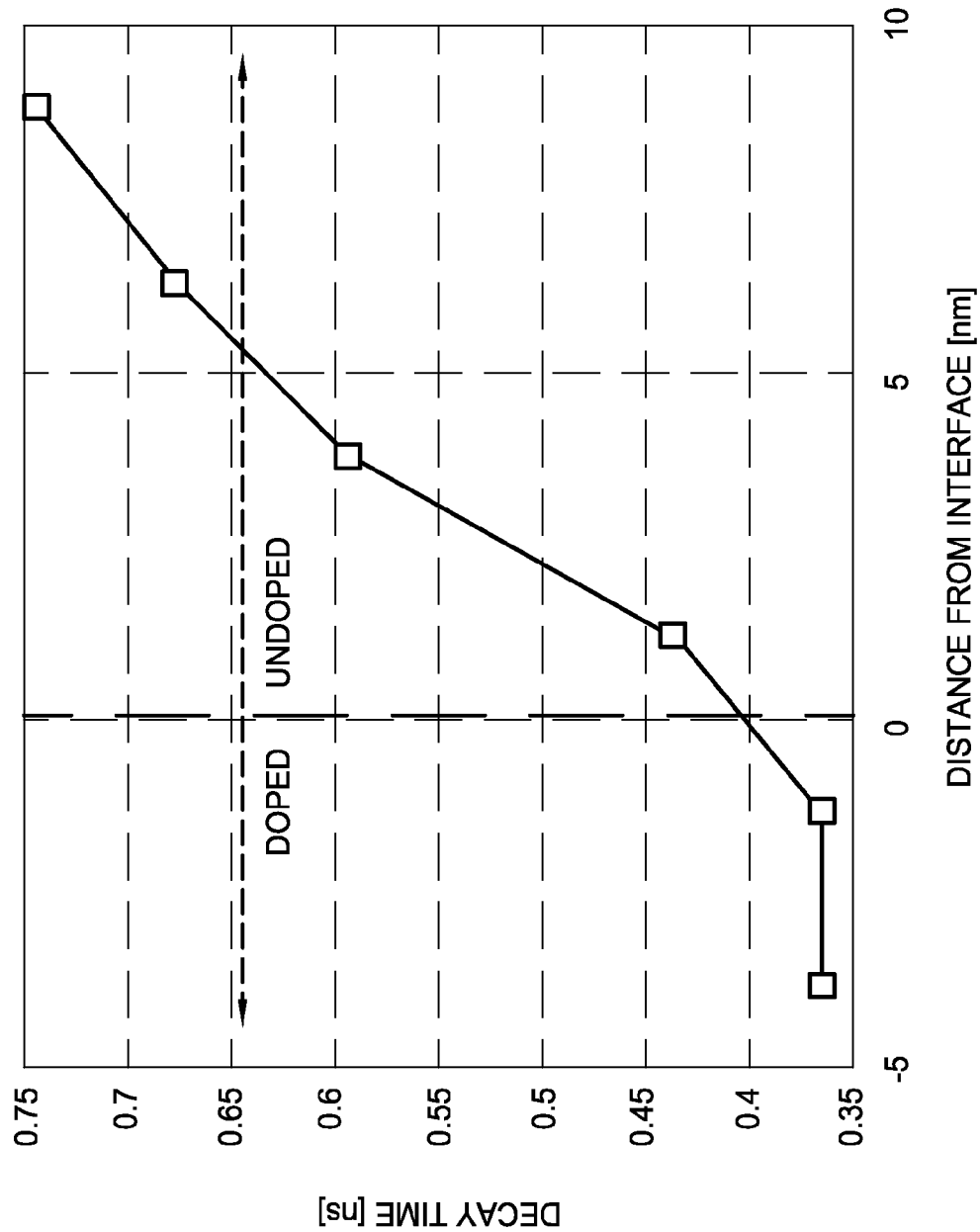
FIGS. 3A-D are diagrams depicting characteristics of the magnetic bilayer according to one embodiment of the invention.

FIGS. 3A-D are block diagrams depicting results of micromagnetic simulations of exemplary properties of a bilayer nano-element according to one embodiment of the invention. As depicted in FIG. 3A, decay time for a fluctuating magnetization (e.g., resulting from a change in an applied external magnetic field), which may be inversely proportional to magnetic damping, may be strong throughout the first layer 102 and may decrease in the second layer 104 with distance from the interface between the first and second layers 102, 104.

Figure 3B:
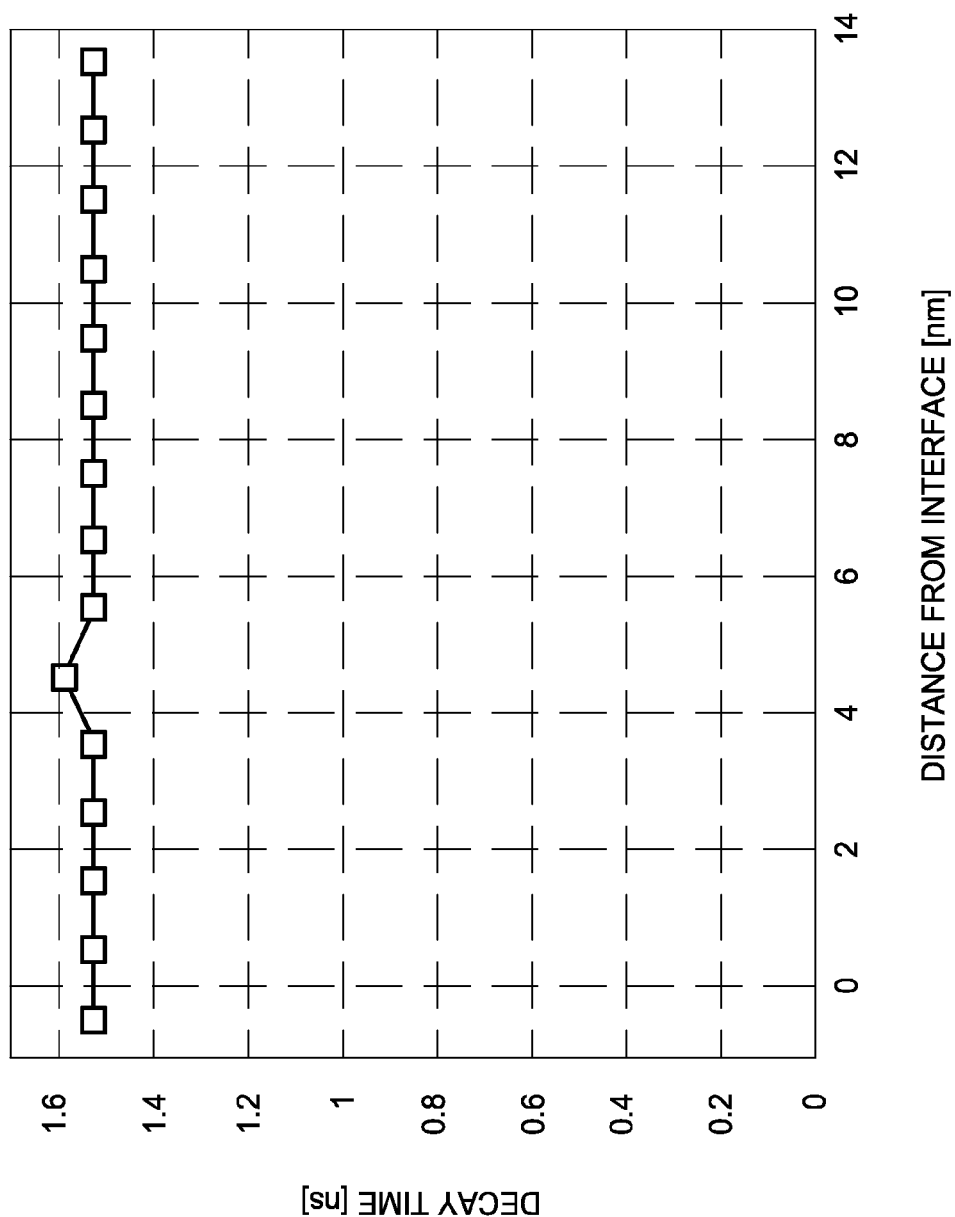

For the embodiment depicted in FIG. 3A, the exchange coupling is relatively small with an exchange constant in the undoped second layer 104 of 2.3e-11 J/m in the second layer 104. By increasing the exchange coupling between the layers 102, 104, the magnetic damping may not decrease as quickly with respect to distance from the interface between the layers 102, 104. For example, as depicted in FIG. 3B, with an exchange constant of 3.0e-11 J/m in the undoped second layer 104, the magnetic damping in the second layer 104 may not decrease significantly at a distance of fourteen nanometers from the interface between the first and second layers 102, 104.

Figure 3C:
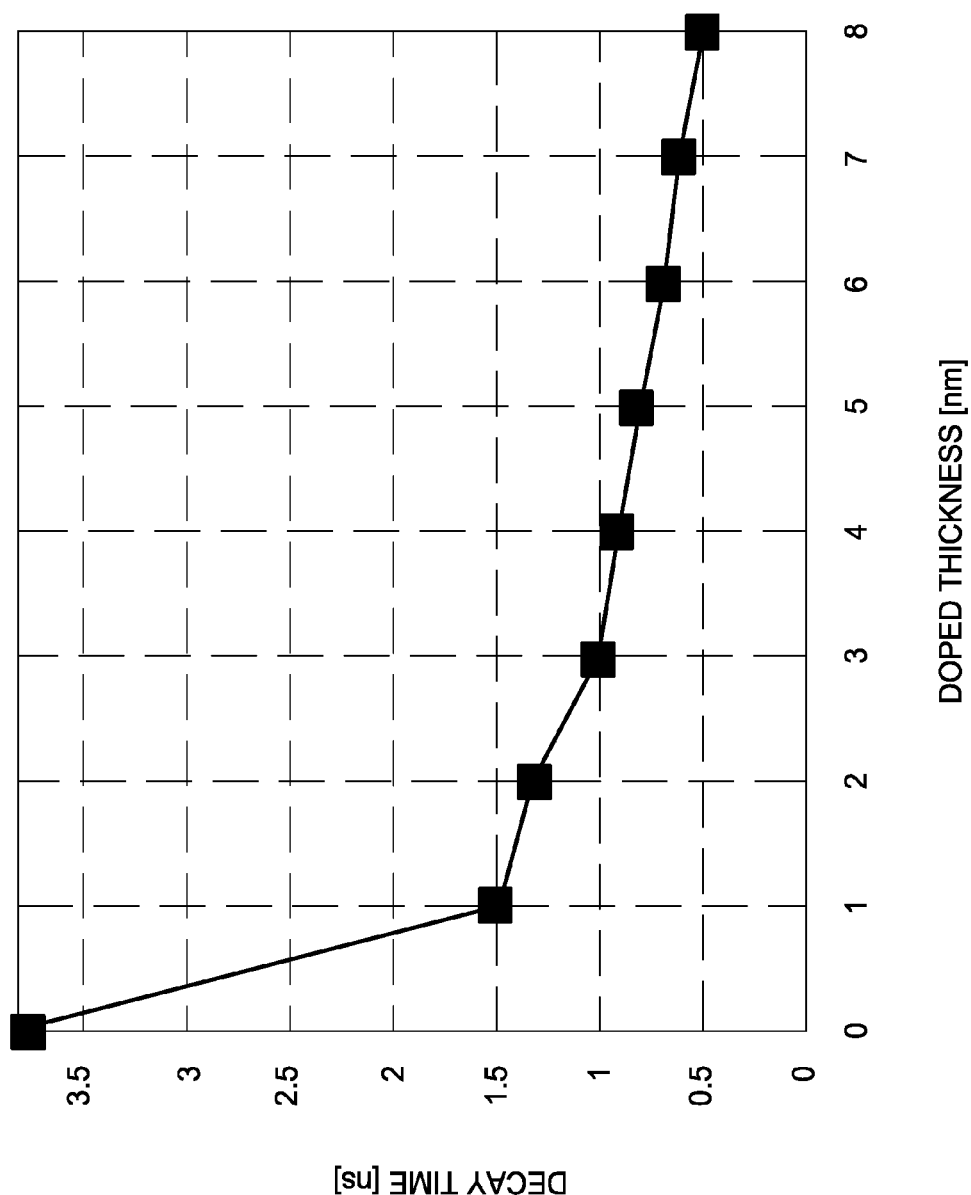
Figure 3D:
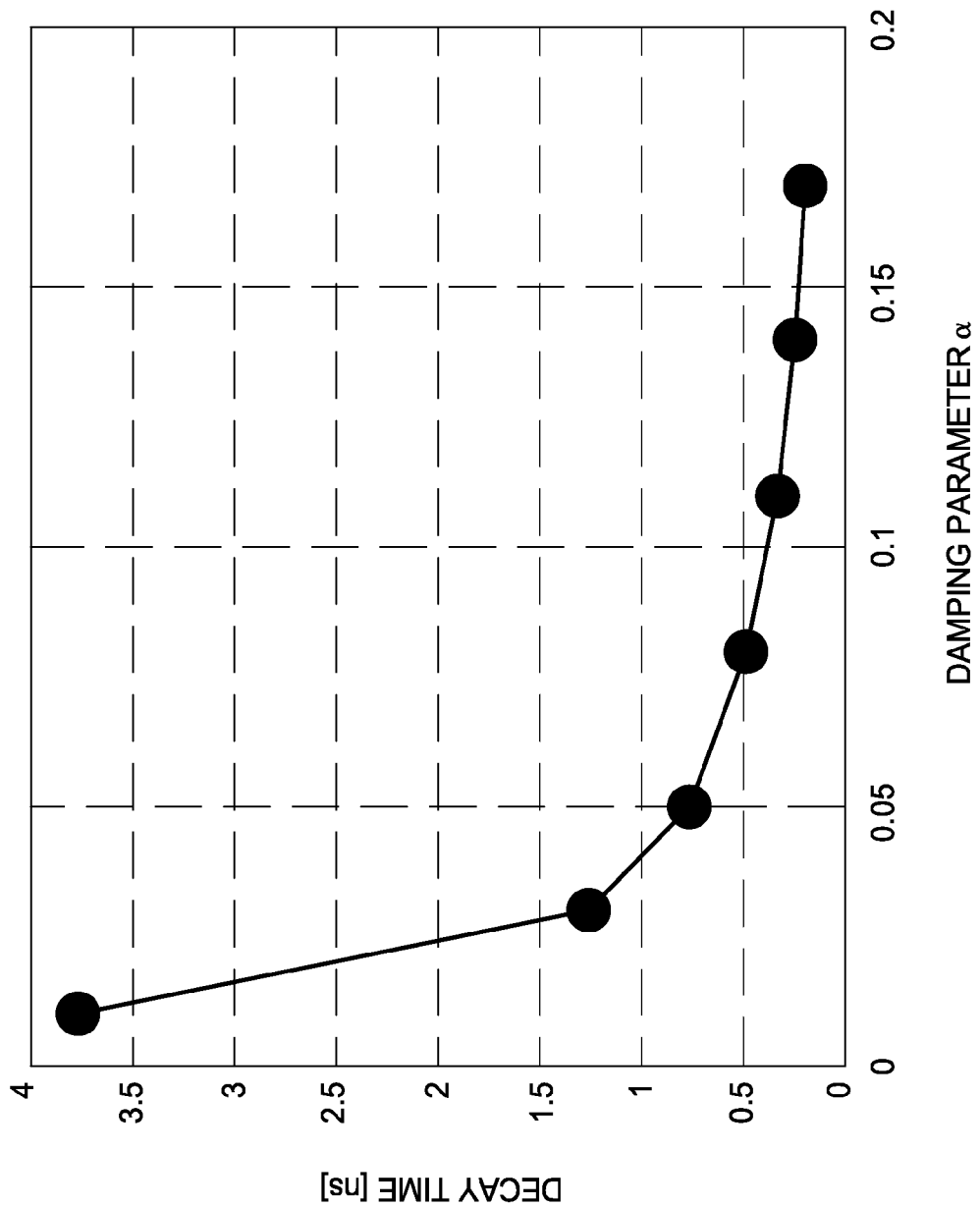

As depicted in FIG. 3C, according to one embodiment of the invention, the decay time in the doped first layer 102 may increase with the thickness T1 of the first layer 102. However, even with a thickness of one nanometer, the decay time in the first layer 102 may be reduced by more than sixty percent (e.g., from 3.76 nanoseconds (ns) to 1.5 ns). FIG. 3D depicts the inverse relationship between decay time and magnetic damping in a doped ferromagnetic layer with uniform magnetic damping according to one embodiment of the invention. By comparing FIGS. 3B, 3C, and 3D, it is apparent that a doped first layer 102 of one nanometer thickness and a magnetic damping coefficient of 0.17 is as effective in damping an undoped second layer 104 which is fourteen nanometers thick (as in FIG. 3B) as uniform doping of an entire ferromagnetic layer fifteen nanometers thick with a uniform damping coefficient of 0.03. Thus, by increasing the magnetic damping in the first layer 102, damping in the second layer 104 may also be increased without any doping of the second layer 104.

Use of the Layer System in Devices

In one embodiment of the invention, the layer system, e.g. the bilayer 100 may be used in one or more electronic devices. Such devices may include a hard drive, magnetic random access memory (MRAM), and spin-torque memory device. Embodiments also provide nanostructures such as nanowires or nano-particles made of the material of the second layer 104 covered by material of the first layer 102 or vice versa.

Within a hard drive, the bilayer 100 may be used within a magnetic read/write sensor or within the hard disk. The read/write sensor may include any type of read sensor known to those skilled in the art such as a tunneling magneto-resistive (TMR) sensor, a giant magneto-resistive (GMR) sensor, or an Anisotropic Magnetoresistive (AMR) sensor. Such read sensors may also be top-spin, bottom-spin, or dual-spin type read sensors. The bilayer 100 may also be used in the magnetic write pole of a read/write sensor or in the magnetic shields of a read/write sensor.

Figure 4:
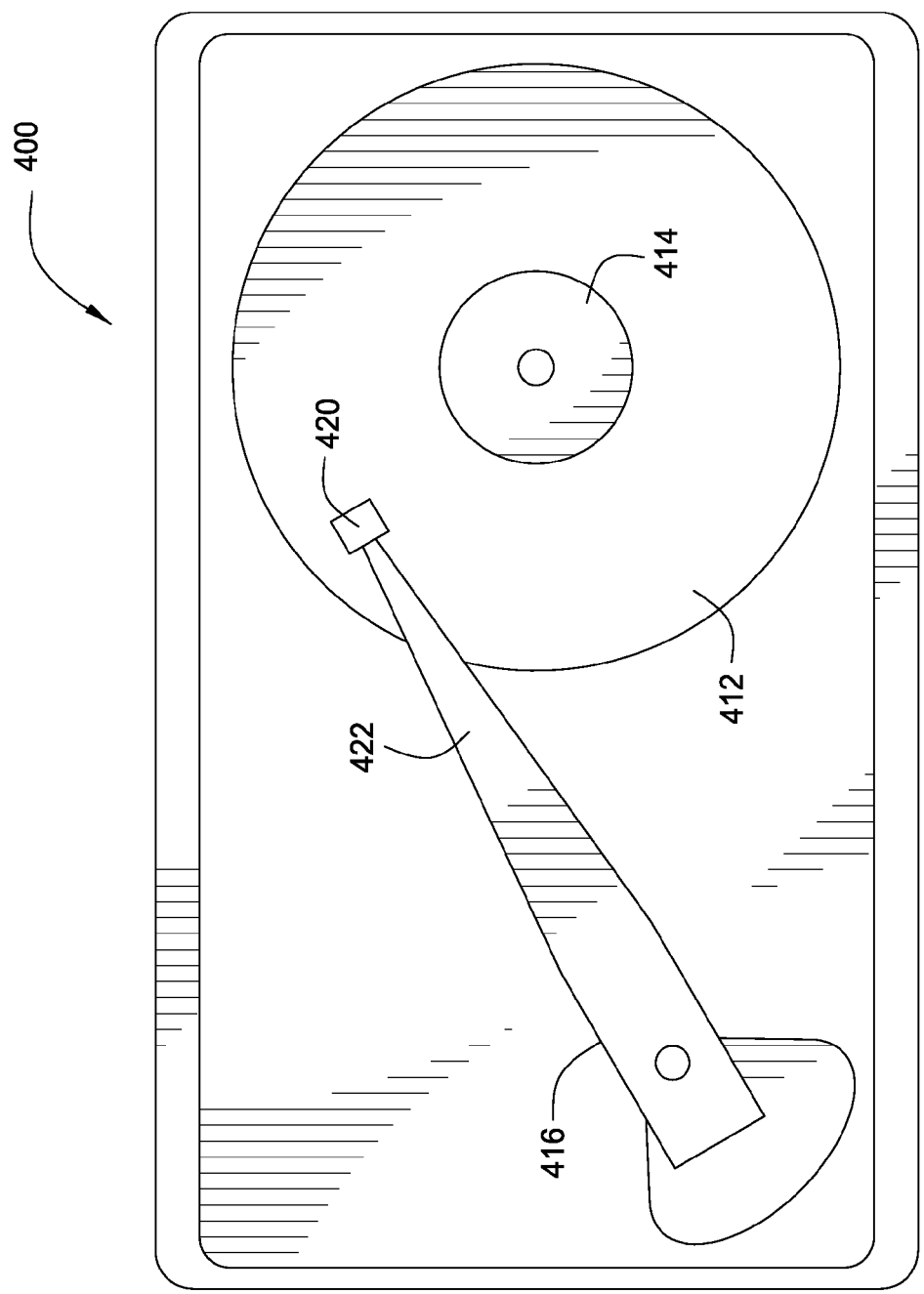
FIG. 4 is a block diagram depicting a hard drive according to one embodiment of the invention.

FIG. 4 is a block diagram depicting a hard drive 400 according to one embodiment of the invention. The hard disk drive 400 includes a magnetic media hard disk 412 mounted upon a motorized spindle 414. An actuator arm 416 is pivotally mounted within the hard disk drive 400 with a slider 420 disposed upon a distal end 422 of the actuator arm 416. During operation of the hard disk drive 400, the hard disk 412 rotates upon the spindle 414 and the slider 420 acts as an air bearing surface (ABS) adapted for flying above the surface of the disk 412. The slider 420 includes a substrate base upon which various layers and structures that form a magnetic read/write sensor are fabricated. Magnetic read/write heads disclosed herein can be fabricated in large quantities upon a substrate and subsequently sliced into discrete magnetic read/write sensors for use in devices such as the hard disk drive 400.

Figure 5A:
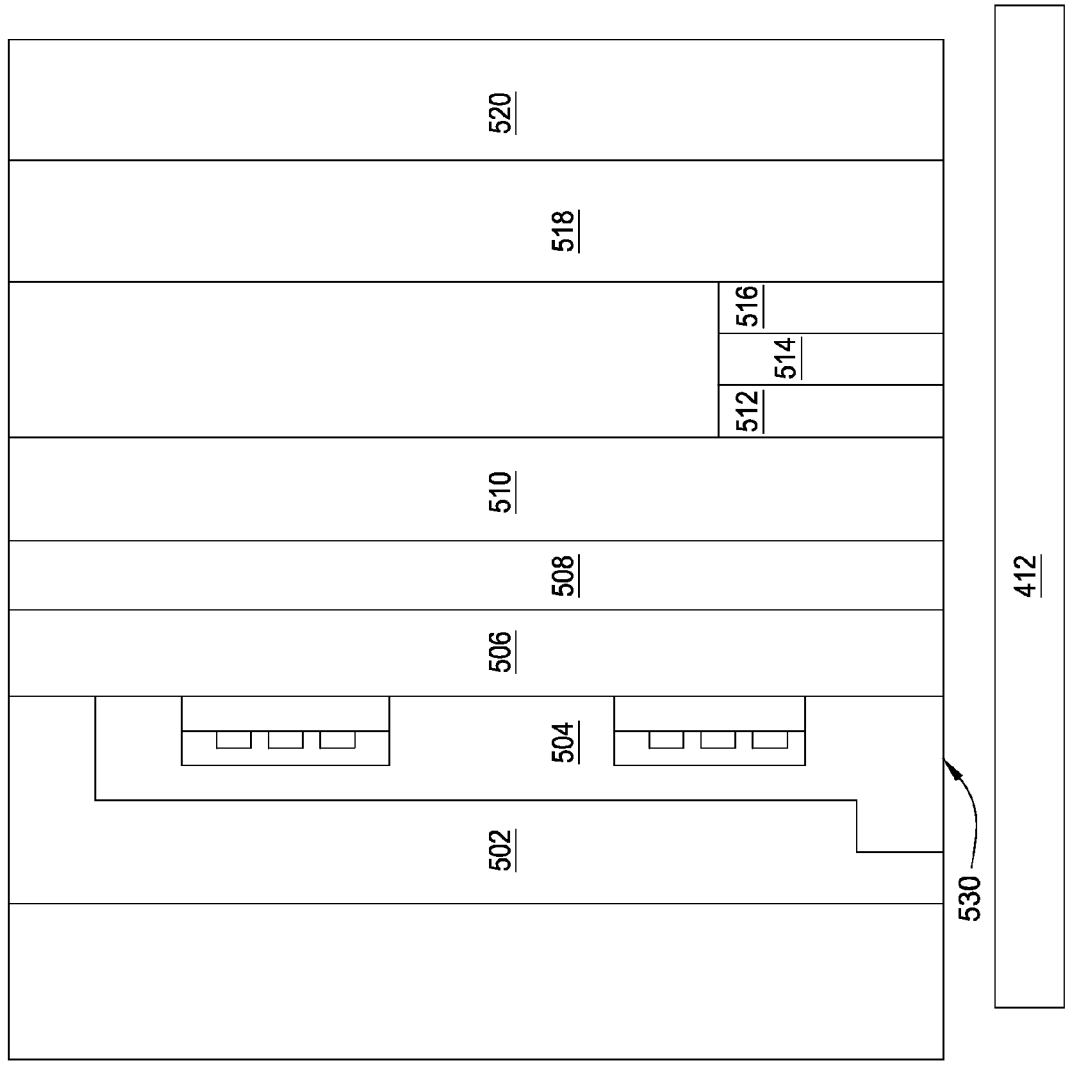
FIGS. 5A-B are block diagrams depicting a magnetic read and write head according to one embodiment of the invention.

FIG. 5A is a block diagram depicting the read/write head 500 within the hard drive 400 according to one embodiment of the invention. The write head 500 depicted in FIG. 5A may be referred to as a perpendicular write head. In general, embodiments of the invention may be utilized with any type of read/write head 500, including the perpendicular pole type of write head 500 depicted in FIG. 5A. Components of the read/write head 500 may be formed on a substrate 520. The read/write head may include a thin-film read sensor 514 which may be used to read data from the disk 412 via an upper electrode 512 and a lower electrode 516. An upper magnetic shield 510 and a lower magnetic shield 518, as well as an insulating layer 508 may be provided to shield the read sensor 514 from magnetic or electrical interference from other parts of the read/write head 500 (e.g., from interference caused by the write components in the read/write head 500) or from other components within the disk drive 400. Aspects of the read sensor 514 are described below in greater detail with respect to FIG. 6.

The magnetic read/write head 500 may also include circuitry components configured to write data to the disk 412. Such circuitry may include a magnetic coil 504 configured to induce a magnetic field between a magnetic write pole 502 and a magnetic return pole 506. The induced magnetic field may be used to write data to the disk 412, for example, by setting a bit or clearing a bit beneath the write pole 502 and the return pole 506.

In one embodiment of the invention, the magnetic write pole 502 and/or the magnetic return pole 506 may be formed from a single bilayer 100 or laminated bilayers as described below. Alternatively, in one embodiment of the invention, one or more portions of the head 500 may be formed from a single doped material. In one embodiment of the invention, the dopant material provided for the head 500 may be predetermined to provide a magnetic damping in the doped areas which is greater than the intrinsic magnetic damping in the ferromagnetic material being doped. For example, the doped material may include a ferromagnetic material such as nickel-iron (NiFe) which is doped with a dopant material selected from one of a 4d transition metal, 5d transition metal, and 4f rare earth metal, excluding Gadolinium. In one embodiment, any composition of the NiFe alloy may be used, including Ni80Fe20 and Ni45Fe55.

In some cases, the doped regions of the head 500 may be volumetrically doped, such that the doped region is continuous and such that no bilayer 100 is included in the portions of the head 500 where the single doped layer is utilized. Doping may be performed using any appropriate method. For example, doping may be performed by co-sputtering, diffusion or implantation techniques, plating, and any other doping techniques known to those skilled in the art. In one embodiment, the head 500 may also be made from multiple types of ferromagnetic material. For example, portions of the head 500 may be formed from any combination of NiFe alloys, cobalt-iron (CoFe) alloys, and cobalt-nickel-iron (CoNiFe) alloys. In one embodiment, the pole regions 502, 506 may include one or more of CoFe alloys and CoNiFe alloys, thereby providing improved magnetic polarization for the pole regions 502, 506.

In one embodiment, when the head 500 is doped with the dopant material, doping may not be performed on areas of the head 500 which are exposed to the air-bearing surface 530 and/or hard disk 412. In some cases, where doping is not performed on areas of the head 500 which are exposed to the air-bearing surface 530 and/or hard disk 412, corrosion of those areas may be prevented. For example, in one embodiment, all ferromagnetic portions of the write head 500 excluding those exposed to the air-bearing surface 530 and/or hard disk 412 may be doped with the dopant material. In an alternative embodiment, the areas of the head 500 which are exposed to the air-bearing surface 530 and/or hard disk 412 may also be doped with the dopant material as described herein. For example, in one embodiment, all ferromagnetic portions of the write head 500 including those exposed to the air-bearing surface 530 and/or hard disk 412 may be doped with the dopant material. In some cases, protective overcoats, including carbon, silicon-nitride (SiN), or other tribologically robust materials may be applied over regions of the head 500 including, for example, the doped regions.

In one embodiment, the dopant material may form from approximately 0% to 15% of the regions which are doped, thereby providing an increase in damping as described herein. In some cases, areas of the head 500 which are doped may each be doped uniformly (e.g., with the same concentration of dopants). Optionally, different areas of the head 500 may be doped with differing concentrations of the dopant material.

Figure 5B:
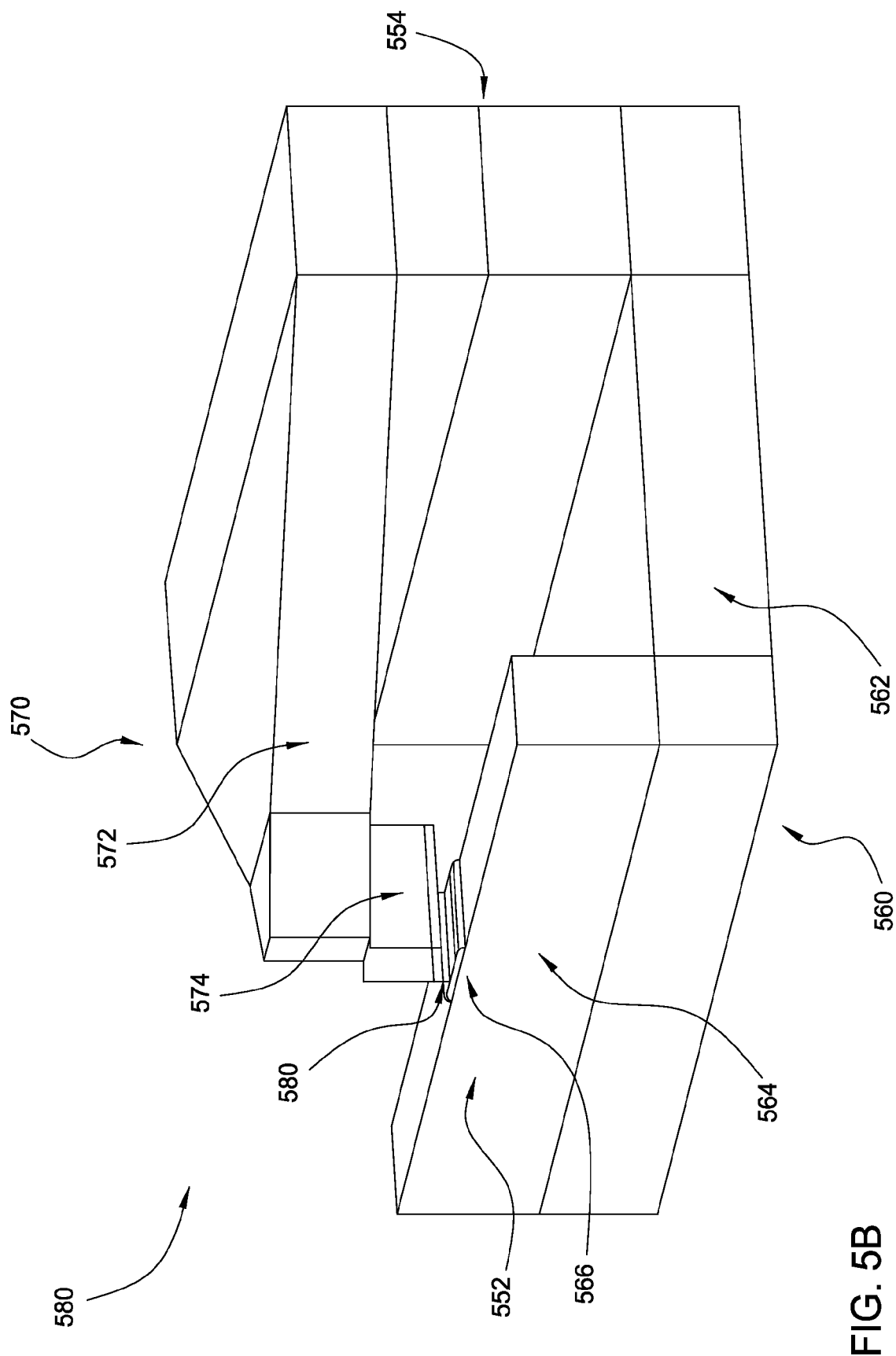

While described above with respect to doping regions of a perpendicular pole type write head 500, embodiments of the invention may also be utilized with a ring-type write head 550 as depicted in FIG. 5B. The write head 550 depicted in FIG. 5B may be referred to as a longitudinal write head. The depicted write head 550 may also be used with the hard drive 400 described above. As depicted, the write head 550 may include a first pole 560 and a second pole 570. The first pole 560 may include a first pole yoke 562, first pole pedestal 564, and first pole notch 566. The second pole 570 may include a second pole yoke 572 and a second pole pedestal 574. The first pole 560 and second pole 570 may be separated by a gap 580 facing the air-bearing surface 552 of the write head 550. The gap 580 may be 20 to 100 nanometers wide and may include an air gap or may be filled with a non-magnetic material. The first pole 560 and second pole 570 may also be connected by a back gap 554.

In one embodiment of the invention, one or more portions of the head 550 may be formed from a single doped material as described above. For example, in one embodiment, the entire head 550 may be doped with the dopant material, including the first pole 560 and the second pole 570. In another embodiment, only a single pole (e.g., the first pole 560 or the second pole 570) may be doped with the dopant material. For example, in one embodiment, only the first pole pedestal 564 and first pole notch 566 may be doped. Where the second pole 570 is doped, the doped areas may include only the second pole yoke 572 and the second pole pedestal 574. In another embodiment, only the second pole pedestal 574, first pole notch 566, and first pole pedestal 564 may be doped with the dopant material. In another embodiment, only pieces adjacent to the gap 580 may be doped (e.g., only the first pole pedestal 564, second pole pedestal 574, and the first pole notch 566). In another embodiment, only the first pole notch 566 and second pole pedestal 574 may be doped. In a further embodiment, only the back gap 554, first pole yoke 562, and second pole yoke 572 may be doped.

In one embodiment, when the head 550 is doped with the dopant material, doping may not be performed on areas of the head 550 which are exposed to the air-bearing surface 552 and/or hard disk 412. In some cases, where doping is not performed on areas of the head 550 which are exposed to the air-bearing surface 552 and/or hard disk 412, corrosion of those areas may be prevented. For example, in one embodiment, all ferromagnetic portions of the write head 550 excluding those exposed to the air-bearing surface 552 and/or hard disk 412 may be doped with the dopant material. In an alternative embodiment, the areas of the head 550 which are exposed to the air-bearing surface 552 and/or hard disk 412 may also be doped with the dopant material as described herein. For example, in one embodiment, all ferromagnetic portions of the write head 550 including those exposed to the air-bearing surface 552 and/or hard disk 412 may be doped with the dopant material.

As described above, the doped regions of the head 550 may be volumetrically doped, such that the doped region is continuous and such that no bilayer 100 is included in the portions of the head 550 where the single doped layer is utilized. Doping may be performed using any appropriate method. For example, doping may be performed by co-sputtering, diffusion or implantation techniques, plating, and any other doping techniques known to those skilled in the art. In one embodiment, the dopant material may form from approximately 0% to 15% of the regions which are doped.

Figure 6:
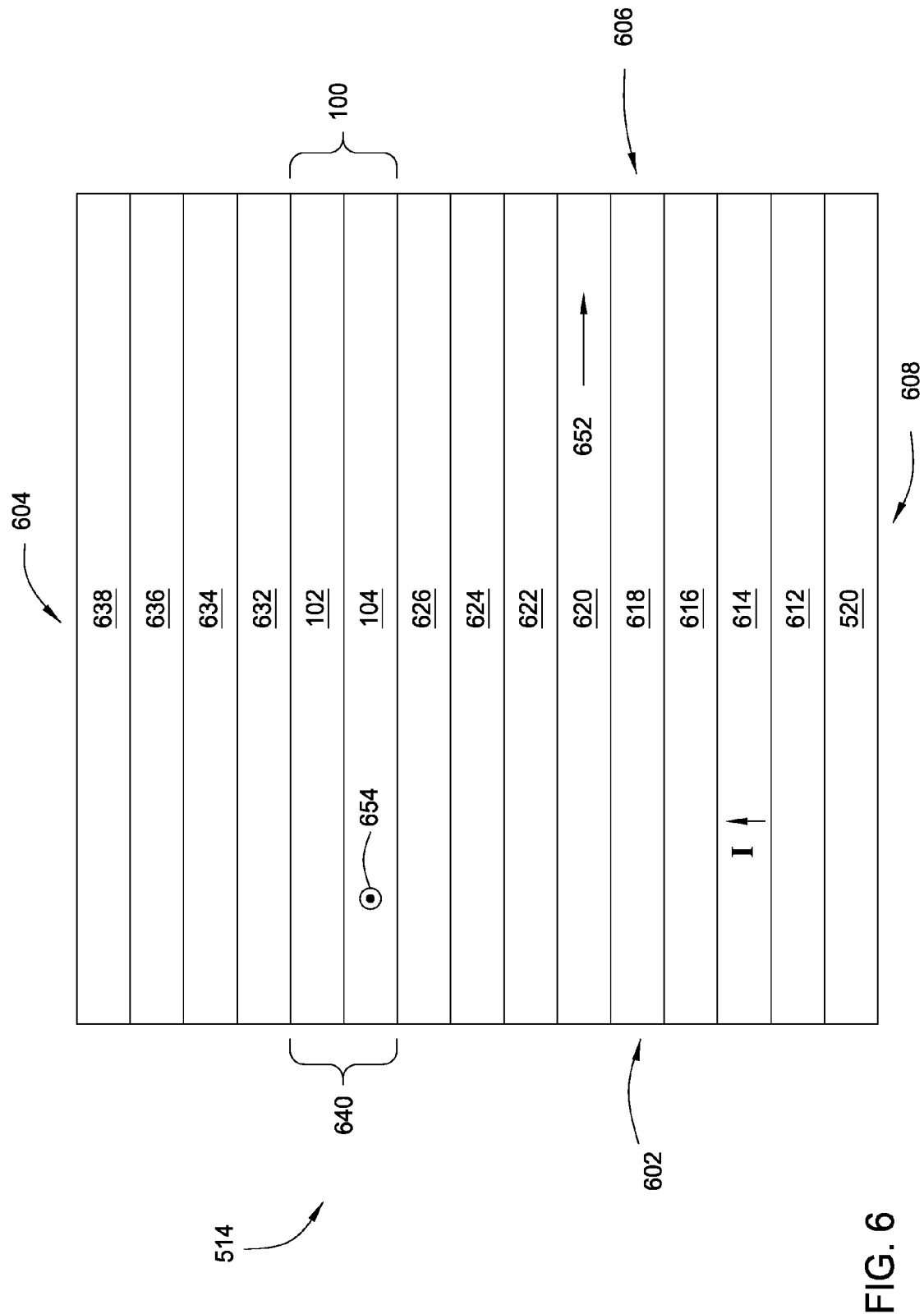
FIG. 6 is a block diagram depicting layers including a magnetic read sensor according to one embodiment of the invention.

FIG. 6 is a block diagram depicting exemplary layers including the read sensor 514 according to one embodiment of the invention. In the depicted embodiment, a tunneling magnetoresistive (TMR) read sensor is shown in which current I tunneling through a tunneling barrier layer 626 is affected by the alignment of a magnetic field 654 in a free layer 640 (the magnetic field 654 may be changed, e.g., due a magnetic charge stored on a disk 412) and a pinned layer 620 with a magnetic field 652 which is pinned to a given alignment by an antiferromagnetic (AFM) pinning layer 618. The magnetic read head 200 may have a bottom side 608, top side 604, a side 602 which acts as an air bearing surface (ABS), and a back surface 606 opposite to the ABS side 602. While described with respect to a TMR read sensor, embodiments of the invention may be utilized with any type of read sensor known to those skilled in the art.

As depicted, the magnetic read head 600 may include the substrate 520 and an initial underlayer 612. A magnetic shield layer 614 may plated on the underlayer 612 and a Tantalum (Ta) and/or Ruthenium (Ru) spacer layer 616 may be deposited on the shield layer 518. An Iridium-Manganese-Chromium (IrMnCr) pinning layer 618 may then be deposited on the Ta/Ru spacer layer 616, followed by a Cobalt-Iron (CoFe) pinned layer 620. In one embodiment, the pinned layer 620 may be about 25 angstroms (Å) thick. The pinning layer 618 may fix the direction of a magnetization 652 of the pinned layer 620 substantially in a direction directed from right to left or from left to right. On the pinned layer 620, another Ru spacer layer 622 may be deposited, followed by a Cobalt-Iron-Boron (CoFeB) reference layer 624. In one embodiment, the reference layer 624 may be about 20 Å thick. A Magnesium-Oxide tunneling barrier layer 626 may be deposited on the reference layer 624, followed by a free layer 640.

As mentioned above, the free layer 640 may provide a magnetic field 654 directed either out of the sensor or into the sensor 514. Alignment of the magnetic field 654 within the free layer 640 may be changed according to which data is stored in the magnetic disk 412. The alignment of the magnetic field 654 may in turn affect the current I flowing through the read sensor 514. By measuring the current I, the data stored in the magnetic disk 412 may be read. In one embodiment of the invention, the free layer 640 may be formed from the bilayer 100 described above. Thus, the free layer 640 may include the doped first layer 102 and undoped second layer 104. By forming the free layer 640 from the bilayer 100 described above, changes in the alignment of the magnetic field 654 of the free layer 640 may be more defined (e.g., with less ringing) due to the increased magnetic damping of the bilayer 100, thereby providing more defined changes in the current I and allowing improved reading of data from the magnetic disk 412.

Furthermore, as mentioned above, in one embodiment of the invention, the undoped ferromagnetic second layer 104 may be placed between the doped first layer 102 and the interface with the active tunneling barrier layer 626 (or, in a GMR or AMR sensor, between the doped first layer 102 and the interface with the active separation layer between the free layer 640 and pinned layer 620). By placing the undoped ferromagnetic second layer 104 between the doped first layer 102 and the interface with the active tunneling barrier layer 626, the second layer 104 may isolate the interface with the active layer from the potentially detrimental effects on the spin transport such as a reduction in magnetic moment density or spin polarization caused by the dopants.

After the free layer 640, other spacer layers 632, 634 may be deposited on the free layer 640 followed by a lead layer 636 and a second shield layer 638 which is plated on the lead layer 636. In general, the depicted layers are exemplary layers and a read sensor 514 may, in some cases, contain more layers or fewer layers at different thicknesses as known to those skilled in the art. Similarly, materials other than those shown may be used for given layers as known to those skilled in the art. For example, in one embodiment of the invention, the pinned layer 620 may be formed from a bilayer 100 as described above.

In one embodiment of the invention, the upper and/or lower magnetic shields 510, 518 may be formed from the bilayer 100. For example, in one embodiment, to provide additional magnetic shielding, the upper and/or lower magnetic shields 510, 518 may be formed from laminated bilayers 700 (e.g., multiple bilayers 100 deposited on each other) as depicted in FIG. 7. The laminated bilayers 700 may include doped ferromagnetic layers 702, 706, 710 (each corresponding to the first layer 102 described above) and alternating undoped ferromagnetic layers 704, 708, 712 (each corresponding to the second layer 104 described above). In one embodiment the thicknesses T1, T3, T5, of the doped ferromagnetic layers 702, 706, 710 (corresponding to thickness T1 in FIG. 1 above) may each be the same. Optionally, some or all of the thicknesses T1, T3, T5 may be different in order to provide the desired magnetic damping. Similarly, other properties of the doped ferromagnetic layers 702, 706, 710, such as, for example, the doping in each of the layers 702, 706, 710 may be the same or different as desired. Furthermore, with respect to the thicknesses T2, T4, T6 and properties of the undoped ferromagnetic layers 704, 708, 712, each may be the same or different as desired.

While described above with respect to laminated bilayers 700 which may be used in upper and/or lower magnetic shields of a read/write sensor, laminated bilayers 700 may also be used in other portions of the read/write sensor. For example, in one embodiment of the invention, the magnetic write pole 502 and/or the magnetic return pole 506 may be formed from a single bilayer 100 or laminated bilayers 700.

Figure 8:
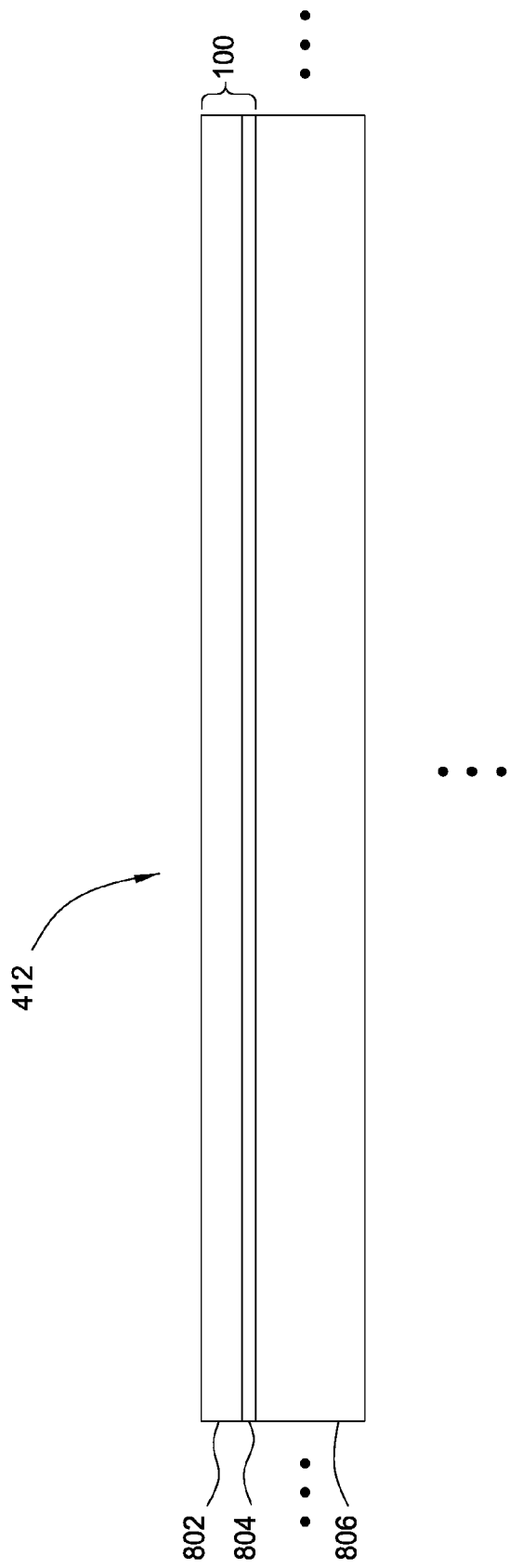
FIG. 8 is a block diagram depicting a magnetic recording disk according to one embodiment of the invention.

In one embodiment of the invention, the bilayer 100 (or laminated bilayers 700) may also be used in a magnetic disk 412 as depicted, for example, in FIG. 8. As depicted, the disk 412 may include a patterned substrate 806 upon which, for a magnetic bit of data, the doped first layer 804 (corresponding to the first layer 102 in FIG. 1) is deposited. The undoped second layer 802 (corresponding to the second layer 104 in FIG. 1) may then be deposited over the first layer 804. In some cases, bits of data in the recording medium of the magnetic disk may be stored closely together to provide increased information storage density for the disk 412. For example, each bit may be stored as magnetization in an area of the recording medium. In general, magnetization or changes in magnetization in a bit may inadvertently interfere with (e.g., alter or weaken) the magnetization in adjacent bits. In some cases, as described above, the undoped second layer 802 may isolate the doped first layer 804 from a potentially harmful atmosphere (e.g., within the hard drive housing) surrounding the disk 412.

In general, embodiments of the invention may also be used with any ordering of doped and undoped layers. For example, in one embodiment, a sandwiched layer may be formed from an undoped layer deposited between two doped layers, thereby providing exchange coupling between the doped layers and the undoped layer at each end of the undoped layer and providing increased magnetic damping throughout the undoped layer. In one embodiment, a trilayer may also be formed from a doped layer sandwiched between two undoped layers. Each undoped layer may be exchange coupled to the doped layer between the undoped layers, thereby providing increased magnetic damping in each of the undoped layers. Embodiments of the invention may also be utilized with alternating laminations of the sandwiched layers described above (e.g., a first sandwiched layer of doped-undoped-doped material followed by a second sandwiched layer of undoped-doped-undoped material) or any combination/ordering thereof.

In one embodiment of the invention, the doped layer and the undoped layer may not be deposited directly on each other. For example, in one embodiment, one or more non-magnetic metal layers may be deposited between the doped layer and the undoped layer. The metals used in the non-magnetic metal may include, for example, Copper (Cu), Ruthenium (Ru), Iridium (Ir), Chromium (Cr), Palladium (Pd), Platinum (Pt), and/or Rhodium (Rh). Where a non-magnetic metal layer is placed between the doped layer and the undoped layer, the exchange coupling between the doped and undoped layer via the modulating layer may be reduced. By reducing the coupling between the doped layer and the undoped layer, the modulating layer may thereby be used to reduce the damping coefficient in the undoped layer where desired. Such a modulating layer(s) may also be utilized with lamination of layers, sandwiched layers, and laminations of sandwiched layers as described above. Embodiments of the invention may also be utilized with any combination or ordering of bilayers, sandwiched layers, and modulating layers. The modulating layers may also be utilized to provide graded doped and undoped layers described below (e.g., to produce a gradient, multiple laminated layers may include modulating layers varying from large thicknesses which provide large modulation to small thickness or omission of the modulating layer entirely).

Embodiments of the invention may also be used to provide graded doped and undoped layers, for example, such that the combination of alternating layers (including sandwiched layers and modulated layers as described above) provides a magnetic damping coefficient which varies across the alternating layers. In general, any gradient may be provided (e.g., a linear gradient from strong magnetic damping to weak or any varying gradient) according to the desired magnetic damping properties.

Figure 9:
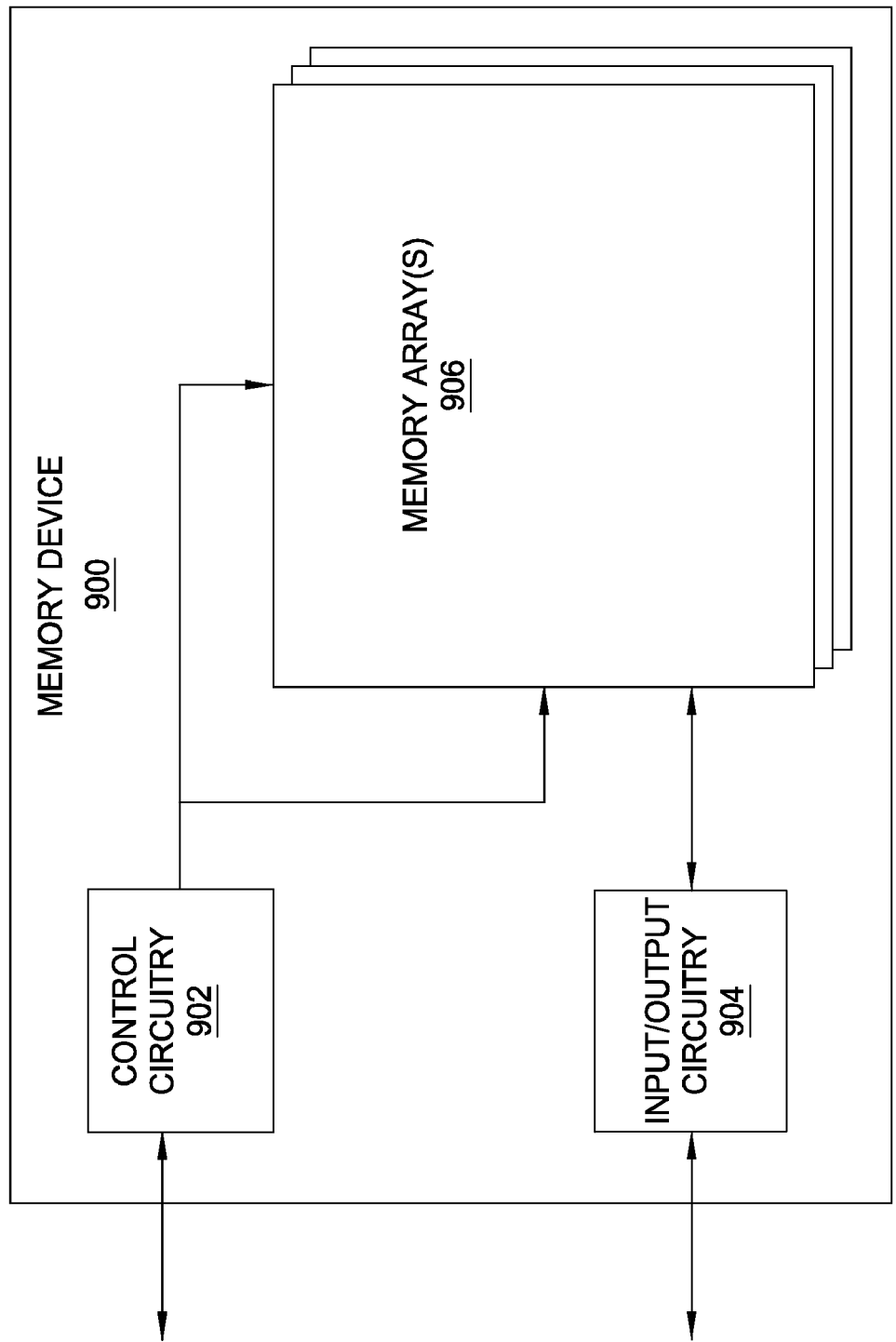
FIG. 9 is a block diagram depicting a magnetic random access memory (MRAM) memory device according to one embodiment of the invention.

In one embodiment of the invention, the bilayer 100 may also be used in a magnetic random access memory (MRAM) device 900 depicted, for example, in FIG. 9. The MRAM device 900 may include control circuitry 902 configured to receive commands from another electronic device such as a processor or memory controller. The MRAM device 900 may also include input/output circuitry 904 configured to input or output data in response to access commands received via the control circuitry 902. Data in the MRAM device 900 may be stored in MRAM memory cells arranged in one or more memory arrays 906.

FIG. 10 is a block diagram depicting an MRAM memory cell 1000 which may be included in the MRAM device 900 according to one embodiment of the invention. As depicted, the memory cell 1000 may be located at the junction between a word line 1002 and a bit line 1014 (depicted running into/out of the page). The memory cell 1000 may include a free layer 1004, tunneling barrier layer 1006, pinned layer 1008, and pinning layer 1010.

During reading of the memory cell 1000, current I tunneling through the tunneling barrier layer 1006 may be affected by the alignment of a magnetic field 1020 in the free layer 1004 and a pinned layer 1008 with a magnetic field 1022 which is pinned to a given alignment by an antiferromagnetic (AFM) pinning layer 1010. During writing of data to the memory cell 1000, alignment of the magnetic field 1020 in the free layer 1004 may be changed, e.g., by applying an appropriate signal to the word line 1002 and bit line 1014. In one embodiment of the invention, the free layer 1004 may be formed from the bilayer 100 described above. Thus, the free layer 1004 may include the doped first layer 102 and undoped second layer 104. By forming the free layer 1004 from the bilayer 100 described above, changes in the alignment of the magnetic field 1020 of the free layer 1004 may be more defined with less ringing due to the increased magnetic damping of the bilayer 100, thereby providing improved reading and writing of data from the memory cell 1000.

Furthermore, in one embodiment of the invention, the undoped ferromagnetic second layer 104 may be placed between the doped first layer 102 and the interface with the active tunneling barrier layer 1006. By placing the undoped ferromagnetic second layer 104 between the doped first layer 102 and the interface with the active tunneling barrier layer 1006, the second layer 104 may isolate the interface with the active layer from the potentially detrimental effects on the spin-dependent tunneling probability caused by the dopants.

While described above with respect to MRAM memory cells 1000 which are included in an MRAM memory device 900, embodiments of the invention may be utilized with any MRAM memory cell 1000 provided in any type of device. In some cases, the memory cell 1000 may include additional layers known to those skilled in the art. Furthermore, while described above with respect to MRAM and hard disk drives, embodiments of the invention may be used in any type of device, such as, for example, spin-torque memory devices and nanostructures such as nano-wires or nano-particles made of the material of the second layer 104 covered by material of the first layer 102 or vice versa. In such devices, the doping may be used to tailor the spin momentum transfer properties.

While the foregoing is directed to embodiments of the present invention, other and further embodiments of the invention may be devised without departing from the basic scope thereof, and the scope thereof is determined by the claims that follow.

What is claimed is:

1. A magnetic write head, comprising:
    a first pole and a second pole for the write head, wherein the first pole and the second pole are formed from a ferromagnetic material, and wherein at least one of the first pole and the second pole are doped with a dopant material selected from one of a 4d transition metal, 5d transition metal, and 4f rare earth metal, wherein the dopant material is predetermined to provide a magnetic damping which is greater than the magnetic damping in the ferromagnetic material,
    wherein the doping is not performed on an air-bearing surface of the at least one of the first pole and the second pole, and wherein the magnetic write head comprises both a doped region and the air-bearing surface of the at least one of the first pole and the second pole.

2. The magnetic write head of claim 1, wherein the ferromagnetic material comprises at least one of nickel-iron, cobalt-iron and cobalt-nickel-iron.

3. The magnetic write head of claim 1, wherein the dopant material forms approximately 15% or less of the volumetrically doped regions of the magnetic write head.

4. The magnetic write head of claim 1, wherein the write head is a perpendicular pole type write head.

5. A hard drive, comprising:
    a magnetic storage medium; and
    a magnetic write head configured to write to the magnetic storage medium, comprising:
        a first pole and a second pole for the write head, wherein the first pole and the second pole are formed from a ferromagnetic material, and wherein at least one of the first pole and the second pole are doped with a dopant material selected from one of a 4d transition metal, 5d transition metal, and 4f rare earth metal, wherein the dopant material is predetermined to provide a magnetic damping in doped regions which is greater than the magnetic damping in the ferromagnetic material,
        wherein the doping is not performed on an air-bearing surface of the at least one of the first pole and the second pole, and wherein the magnetic write head comprises both the doped regions and the air-bearing surface of the at least one of the first pole and the second pole.

6. The hard drive of claim 5, wherein the ferromagnetic material comprises at least one of nickel-iron, cobalt-iron and cobalt-nickel-iron.

7. The hard drive of claim 5, wherein the dopant material forms approximately 15% or less of the volumetrically doped regions of the magnetic write head.

8. The hard drive of claim 5, wherein the write head is a perpendicular pole type write head.

* * * * *